Patented July 23, 1940

2,208,941

UNITED STATES PATENT OFFICE 2,208,941

HYDROXY MERCURY COMPOUND AND METHOD FOR THE PRODUCTION THEREOF

Ernö Geiger, László Vargha, and László Richter, Budapest, Hungary, assignors to Chemical Works of Gedeon Richter Ltd., Budapest, Hungary No Drawing. Application February 12, 1938, Serial No. 190,222. In Hungary September 18, 1937

5 Claims. (Cl. 260—431)

This invention relates to a hydroxy mercury compound of allyl-carbamide and to a method for its production.

It is known that numerous aromatic compounds containing an unsaturated conjunction in the side chain, by taking up mercury are transformed into diuretic agents. We have succeeded in producing an unsaturated aliphatic compound, the mercury derivative of which shows a diuretic effect at least equivalent compared with the corresponding aromatic compounds.

The subject-matter of the invention is a white powder consisting of a hydroxy mercury-compound of the reaction product of allyl-carbamid succinic anhydride. Such compound is N($\gamma$ hydroxy $\beta$ hydroxy mercury propyl) carbamyl $\beta$ carbamyl propionic acid. For solution in water preferably the alkali-salts thereof are used.

According to the invention for the production of the aforesaid compound allyl-carbamide is brought into reaction with succinic anhydride, and the resultant unsaturated acid-amide is combined with mercury by adding mercury salts in the usual manner. The alkali salts of the resultant mercury compounds are highly soluble in water.

Example

The pulverized mixture of 50 grams of allyl-carbamide and 50 grams of succinic anhydride is heated for 30 minutes at 110° C. After cooling the fused mass is ground with 50 cubic centimetres of cold water and the crystalline mass after quick filtering from the liquid is recrystallized from hot water. The white crystalline needles having a melting point of 142–144° C. are the allyl-succinyl-carbamide, a compound as yet unknown. In order to produce a mercury compound thereof a mixture of 20 grams of the allyl-succinyl-carbamide and of 30 grams of mercury-acetate is shaken for 3 hours with methanol. The scarcely soluble precipitate of the mercury compound after filtration is washed with methanol and with water and dried in vacuum. The white powder melts at 185–186° C. under decomposition and is easily soluble in solutions of alkalis or of bicarbonate of sodium. By action of hydrogensulfid in a medium of alkali the compound becomes decomposed only after a longer time, whilst in acid medium there appears at once a black precipitate of mercury sulfide. Examinations have proved the following structural formula of the compound.

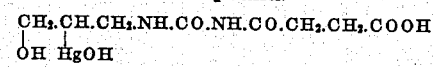

that is, N($\gamma$ hydroxy $\beta$ hydroxy mercury propyl) carbamyl $\beta$ carbamyl propionic acid.

We claim:

1. A hydroxy mercury compound of the reaction product of allyl-carbamide and succinic anhydride.

2. N($\gamma$ hydroxy $\beta$ hydroxy mercury propyl) carbamyl $\beta$ carbamyl propionic acid.

3. A water solution of an alkali-metal salt of the compound defined in claim 1.

4. A water solution of an alkali-metal salt of the compound defined in claim 2.

5. The process which consists of reacting allyl-carbamide with succinic anhydride, and combining the resultant unsaturated acid-amide with a mercury salt, thereby forming a mercury compound.

ERNÖ GEIGER.
LÁSZLÓ VARGHA.
LÁSZLÓ RICHTER.